United States Patent [19]

Garcia

[11] Patent Number: 5,197,600
[45] Date of Patent: Mar. 30, 1993

[54] DISC STORAGE APPARATUS

[76] Inventor: Felix D. Garcia, 5520 W. 98th St., Los Angeles, Calif. 90045

[21] Appl. No.: 872,843

[22] Filed: Apr. 23, 1992

[51] Int. Cl.⁵ .......................................... B65D 85/30
[52] U.S. Cl. ..................................... 206/444; 206/387; 312/9.45; 312/186; 40/377; 40/379
[58] Field of Search ................. 206/444, 387; 312/11, 312/125, 186; 40/377, 379; 211/58

[56] References Cited

U.S. PATENT DOCUMENTS

| | | | |
|---|---|---|---|
| 1,416,689 | 5/1922 | Clutter | 312/11 |
| 2,332,605 | 10/1943 | Scholfield | 40/379 |
| 2,703,744 | 3/1955 | Karper | 40/379 |
| 3,045,529 | 7/1942 | Kuehnle | 40/377 |
| 3,186,463 | 6/1965 | Yerg | 40/377 |
| 3,279,471 | 10/1966 | Ruina | 312/186 |
| 3,943,647 | 3/1976 | Holtsch | 40/377 |
| 4,021,947 | 5/1977 | Shneider | 40/379 |
| 4,057,305 | 11/1977 | Zdeblick | 312/11 |
| 4,079,531 | 3/1978 | Norris et al. | 40/379 |
| 4,221,440 | 9/1980 | Morgan | 312/186 |
| 4,231,624 | 11/1980 | Neilsen | 312/186 |
| 4,286,245 | 8/1981 | McGannon | 40/377 |
| 5,022,516 | 6/1991 | Urban et al. | 206/444 |
| 5,027,950 | 7/1991 | Gutierrez et al. | 206/444 |
| 5,099,995 | 3/1992 | Karakane et al. | 312/11 |

FOREIGN PATENT DOCUMENTS 824210 11/1959 United Kingdom ............... 40/379

Primary Examiner—David T. Fidei
Attorney, Agent, or Firm—Leon Gilden

[57] ABSTRACT

A housing having a semi-cylindrical cavity therewithin is cooperative with a housing cover, with the housing including a support drum rotatably mounted within the semi-cylindrical cavity, with the support drum mounting at least one of an array of holders about the drum for access of a computer disc from the holder.

4 Claims, 4 Drawing Sheets

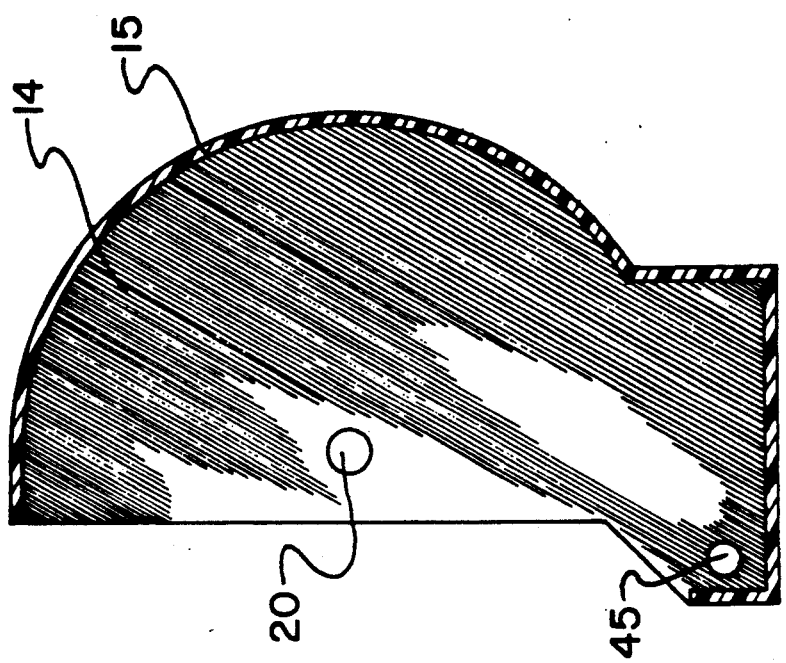
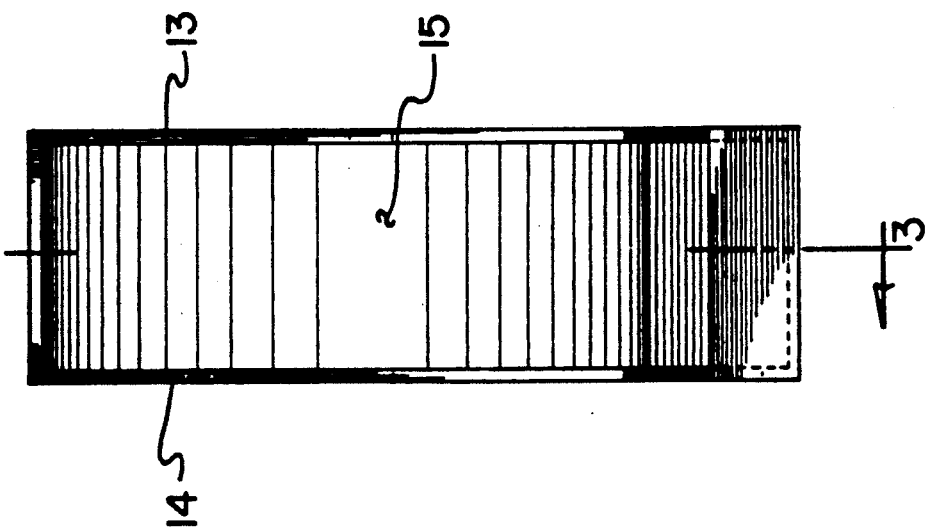

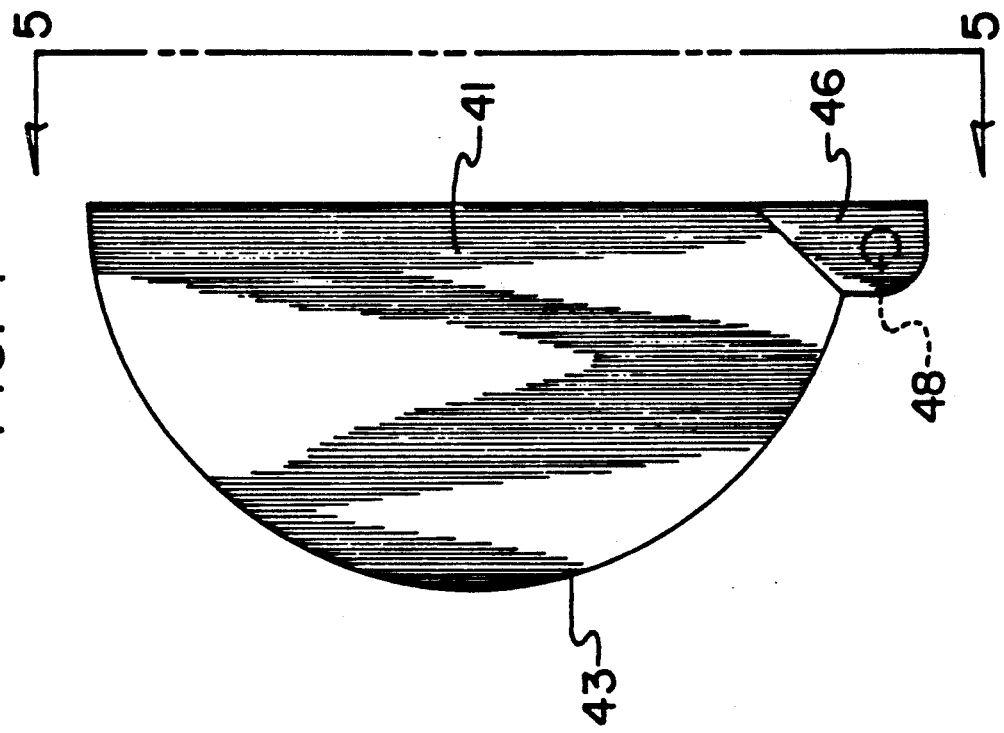
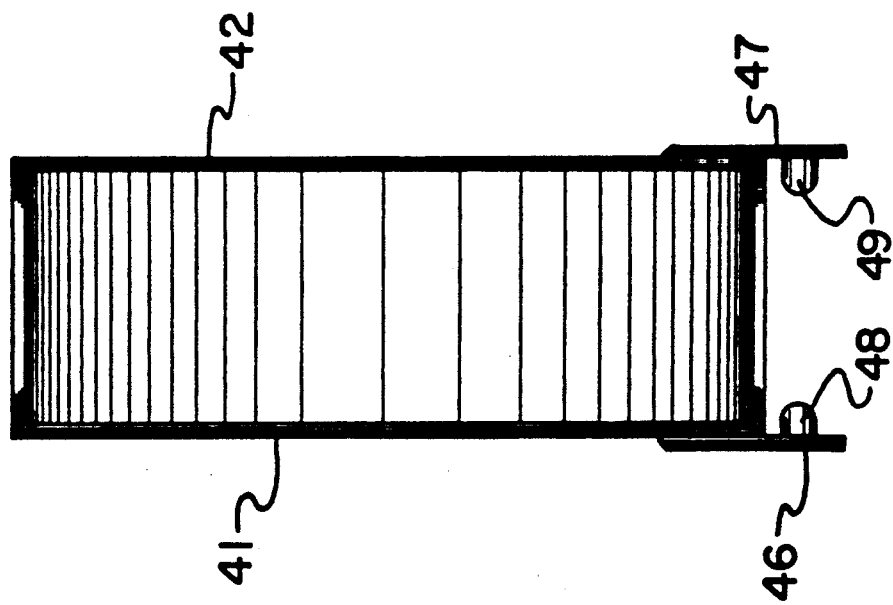

DISC STORAGE APPARATUS

BACKGROUND OF THE INVENTION

1. Field of the Invention

The field of invention relates to computer disc storage apparatus, and more particularly pertains to a new and improved disc storage apparatus wherein the same is arranged for convenience of retrieval of discs relative to a storage assembly.

2. Description of the Prior Art

The use of computer discs in contemporary business and domestic use of computers requires the storage of various master programs and the like. The instant invention attempts to overcome deficiencies of the prior art by providing for a compact storage arrangement providing ease of access and retrieval of various discs relative to the storage apparatus. Prior art computer disc storage structure is set forth in U.S. Pat. Nos. 4,844,261; 4,860,897; and 4,697,704.

Accordingly, it may be appreciated that there continues to be a need for a new and improved disc storage apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of computer disc storage apparatus now present in the prior art, the present invention provides a disc storage apparatus wherein the same provides for a rotatable mounting of holders relative to a central drum of a disc storage unit. As such, the general purpose of the present invention, which will be described subsequently in greater detail, is to provide a new and improved disc storage apparatus which has all the advantages of the prior art disc storage apparatus and none of the disadvantages.

To attain this, the present invention provides a housing having a semi-cylindrical cavity therewithin cooperative with a housing cover, with the housing including a support drum rotatably mounted within the semi-cylindrical cavity, with the support drum mounting at least one of an array of holders about the drum for access of a computer disc from the holder.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved disc storage apparatus which has all the advantages of the prior art disc storage apparatus and none of the disadvantages.

It is another object of the present invention to provide a new and improved disc storage apparatus which may be easily and efficiently manufactured and marketed.

It is a further object of the present innvention to provide a new and improved disc storage apparatus which is of a durable and reliable construction.

An even further object of the present invention is to provide a new and improved disc storage apparatus which is susceptible of a low cost of manufacture with regard to both materials and labor, and which accordingly is then susceptible of low prices of sale to the consuming public, thereby making such disc storage apparatus economically available to the buying public.

Still yet another object of the present invention is to provide a new and improved disc storage apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an orthographic frontal view of the housing structure.

FIG. 3 is an orthographic view, taken along the lines 3—3 of FIG. 2 in the direction indicated by the arrows.

FIG. 4 is an orthographic side view of the cover assembly utilized by the invention.

FIG. 5 is an orthographic view, taken along the lines 5—5 of FIG. 4 in the direction indicated by the arrows.

DESCRIPTION OF THE PREFERRED EMBODIMENT

Figure 1:
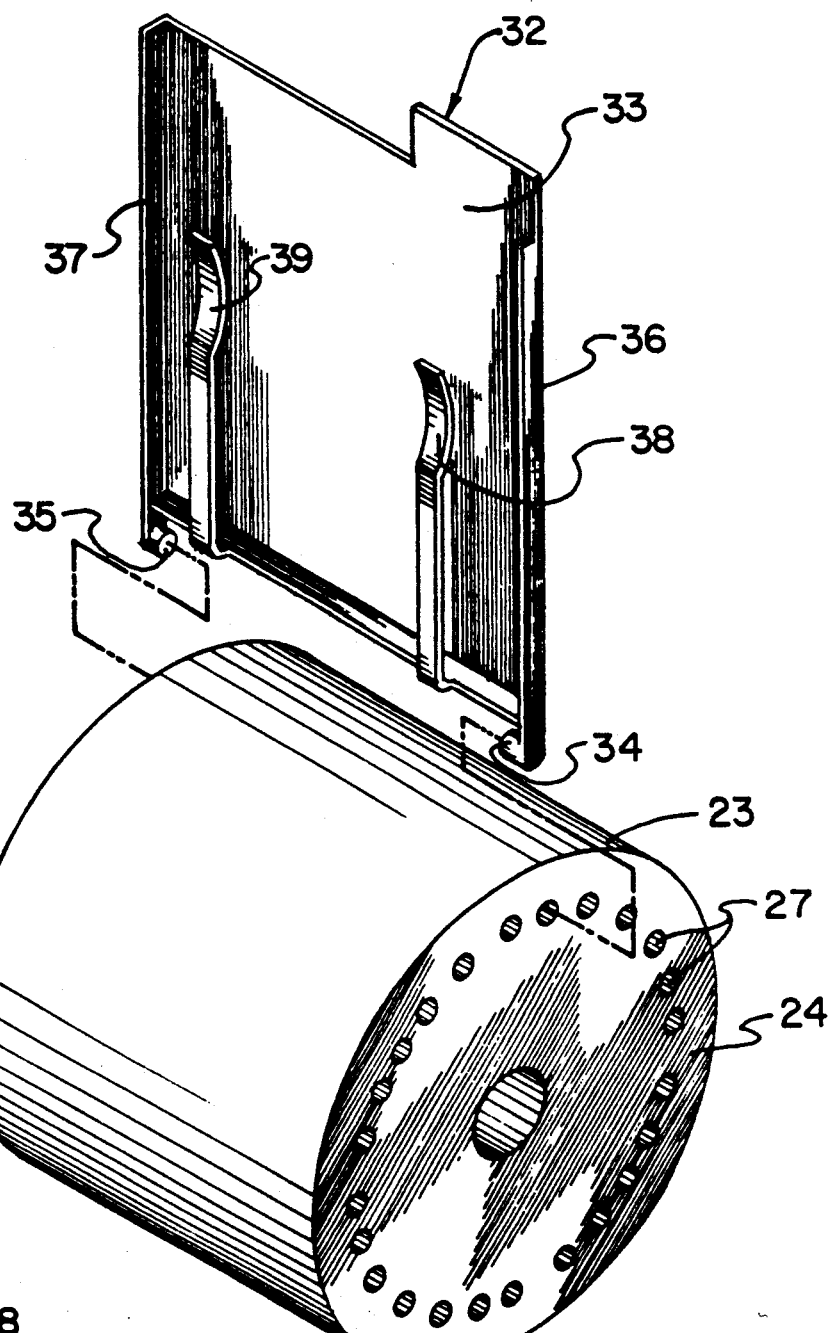
FIG. 1 is an isometric illustration of the drum component of the invention.
Figure 6:
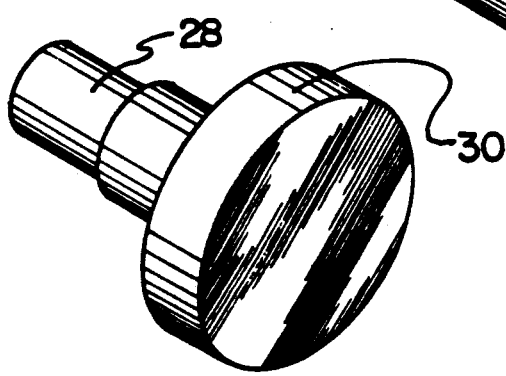
FIG. 6 is an isometric illustration of a support axle structure for mounting the drum within the housing.
Figure 7:
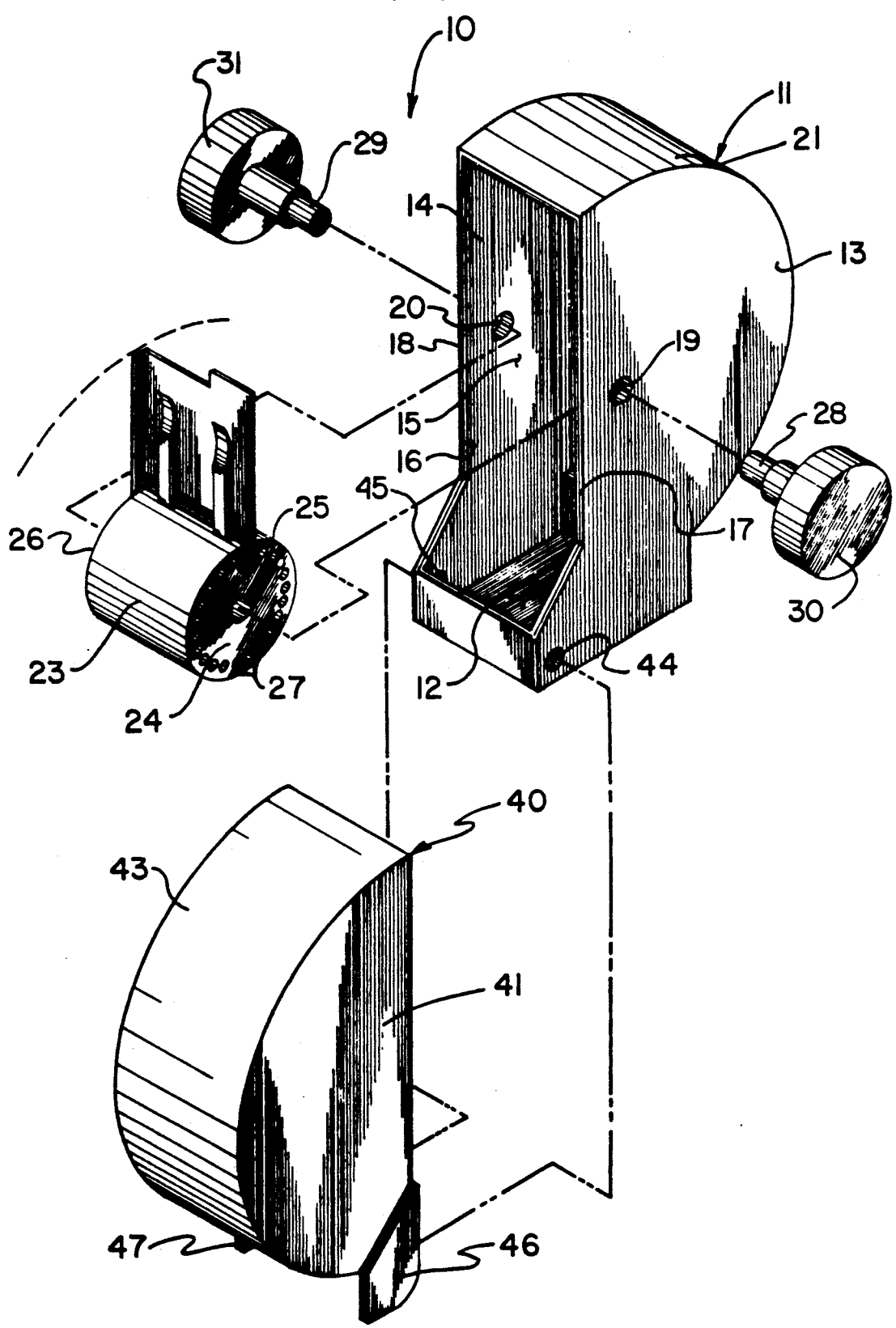
FIG. 7 is an isometric illustration of the instant invention in exploded illustration.

With reference now to the drawings, and in particular to FIGS. 1 to 7 thereof, a new and improved disc storage apparatus embodying the principles and concepts of the present invention and generally designated by the reference numeral 10 will be described.

More specifically, the disc storage apparatus 10 of the instant invention essentially comprises a support housing 11 having a support housing floor 12, including a housing first side wall 13 spaced from and parallel a housing second side wall 14 that are spaced apart a predetermined spacing. The housing includes a semi-cylindrical upper rear wall 21 defining a semi-cylindrical cavity 15 therewithin accessed into the housing through a cavity entrance 16. The cavity entrance 16 is defined between parallel and coextensive first and second side wall vertical forward edges 17 and 18. A cylindrical support drum 23 is rotatably mounted between side walls, with the support drum having first and second end walls 24 and 26, with the support drum axial bore 25 orthogonally oriented relative to the end walls and coaxially directed through the drum. A concentric array of end wall mounting bores 27 are directed into each end wall concentrically about the axial bore. First and second side wall bores 19 and 20 directed through the respective first and second side walls adjacent the first and second forward edges 17 and 18 have the bores coaxially aligned to receive respective first and second axles 28 and 29 through the respective first and second bores 19 and 20. The first and second axles 28 and 29 include respective first and second axle handles 30 and 31 that are mounted fixedly thereto. The axles are rotatably mounted through the first and second bores while fixedly mounted within the axial bore 25 of the drum 23 to permit selective rotation of the drum by rotation of either the first and second handle 30 and 31.

The mounting bores 27 of each end wall are provided to have a mounting bore 27 of the first end wall coaxial with a mounting bore of the second end wall 26 to receive a disc holder 32 thereon. The disc holder 32 is illustrated for purposes of detail, but it is understood that each coaxially aligned pair of the plurality of aligned pairs of mounting bores 27 of each respective end wall are arranged to secure a plurality of such holders 32 in a circular array about the drum 23.

The disc holder 32 is formed with a support plate 33 having respective first and second mounting rods 34 and 35 positioned therebelow in a coaxially aligned relationship relative to one another and parallel relative to a lower edge of the plate 33. First and second side walls 36 and 37 orthogonally mounted relative to the support plate 33 are substantially coextensive therewith, with the lower edge of the support plate having respective first and second spring fingers 38 and 39 in biased abutment with the support plate between the side walls to secure a disc (not shown) secured between the spring fingers and the support plate. The spring fingers, as illustrated, are normally biased in engagement with the support plate to permit ease of mounting and dismounting of a disc thereon.

The cover hood 40 of the invention includes hood first and second side walls 41 and 42 spaced apart the predetermined spacing in a parallel coextensive relationship having a hood semi-cylindrical rear wall 43 defining a hood cavity to receive the drum therein when the cover hood is directed into engagement with the first and second vertical edges 17 and 18. The cover hood includes a first and second spring plate 46 and 47 arranged in parallel relationship below the respective first and second side walls, with the first and second spring plates biased in a parallel relationship having respective first and second plate rods 48 and 49 that are coaxially aligned relative to one another and orthogonally and fixedly mounted to the respective first and second spring plates 46 and 47. Accordingly, the first and second plate rods 48 and 49 are mounted to respective first and second cover mounting bores 44 and 45 of the support housing 11 below and forwardly of the first and second vertical edges 17 and 18. In this manner, pivotment of the cover hood forwardly maintains the cover hood in engagement with the support housing 11 due to the biased relationship of the spring plates 46 and 47.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A disc storage apparatus, comprising,
 a support housing, the support housing including a housing floor, and a first side wall spaced from, parallel to, and coextensive with a second side wall, with the first and second side walls orthogonally mounted to the floor extending upwardly thereof, and
 the housing including a housing rear wall, and a semi-cylindrical cavity defined within the housing between the rear wall and the first side wall and the second side wall, and
 the first side wall including a first side wall forward edge, the second side wall including a second side wall forward edge, with the first side wall forward edge and the second side wall forward edge arranged in a coextensive parallel relationship defining a cavity entrance therebetween, and
 the first side wall including a first side wall bore, the second side wall including a second side wall bore, with the first side wall bore and the second side wall bore coaxially aligned, and
 a rotatable drum, the rotatable drum having a drum axle bore, the drum axle bore coaxially aligned with the first side wall bore and the second side wall bore, and the drum including at least one holder means for mounting a computer disc therewithin, and the drum means includes a cylindrical drum having a first end wall spaced from and parallel to a second end wall, with the first end wall and the second end wall orthogonally oriented relative to the axle bore, and a first axle directed through the first side wall bore into the axle bore, and a second axle directed through the second side wall bore into the axle bore, the first axle having a first handle mounted thereto exteriorly of the first side wall, the second axle having a second handle fixedly mounted thereto exteriorly of the second side wall, wherein the first axle and the second axle are rotatably mounted within the respective first side wall bore and the second side wall bore, and fixedly mounted within the axle bore of the drum, and the first end wall and the second end wall each include a concentric array of mounting bores directed therewithin, and wherein the mounting bores of the first end wall and the second wall pivotally mount said holder.

2. An apparatus as set forth in claim 1 wherein the holder includes a support plate, the support plate having a support plate lower edge, and a first mounting rod and a second mounting rod fixedly mounted to the holder below the support plate parallel relative to the lower support plate edge, with the first mounting rod and the second mounting rod received pivotally within one of said mounting bores of said first end wall and one of said mounting bores of said second end wall.

3. An apparatus as set forth in claim 2 wherein the support plate lower edge includes a first spring finger and second spring finger fixedly mounted to the support plate lower edge, with the first spring finger and the second spring finger in biased communication with the support plate, the support plate including a support plate first side wall and a support plate second side wall fixedly mounted to opposed sides of the support plate, with the first spring finger and the second spring finger positioned between the first side wall and the second side wall.

4. An apparatus as set forth in claim 3 including a cover hood, the support housing including a first cover mounting bore directed through the first side wall below the first side wall vertical edge, and a second cover mounting bore directed through the second side wall below the second side wall bore, wherein the first cover mounting bore and the second cover mounting bore are coaxially aligned, and the cover hood including a cover hood first side wall spaced from and parallel a cover hood second side wall, and a cover hood rear wall defining a cover hood semi-cylindrical cavity, with the cover hood semi-cylindrical cavity concentric with the first side wall bore and the second side wall bore, and the support housing semi-cylindrical cavity concentric with the first side wall bore and the second side wall bore, the cover hood including a first spring plate and a second spring plate parallel and fixedly mounted to the respective cover hood first side wall and the cover hood second side wall, the first spring plate including a first plate rod, the second spring plate including a second plate rod, with the first plate rod and the second plate rod coaxially aligned and directed through the respective first cover mounting bore and the second cover mounting bore.

* * * * *